J. M. DELANEY.
WEED CUTTER.
APPLICATION FILED APR. 25, 1916.
1,195,919.
Patented Aug. 22, 1916.
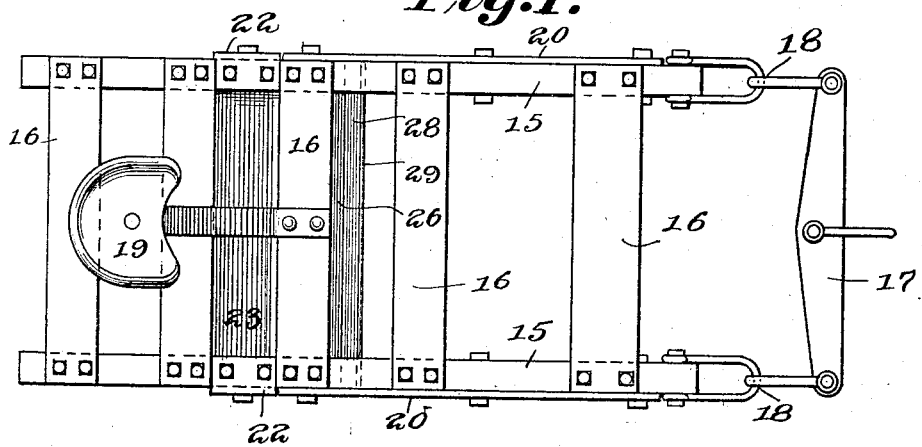
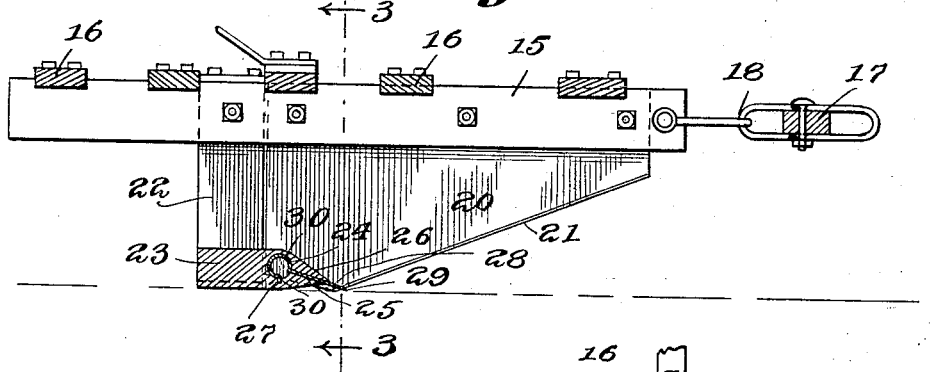
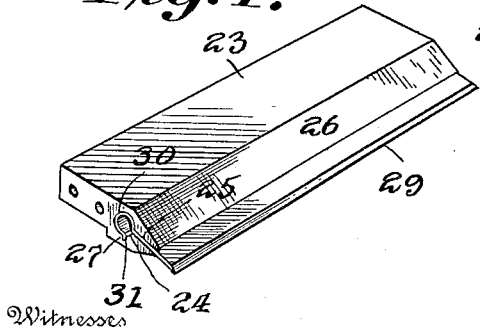
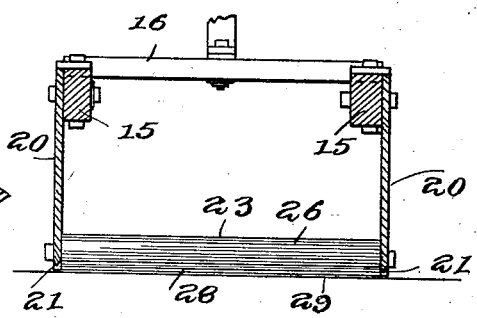
Inventor
James M. Delaney
By Victor J. Evans
Attorney
Witnesses

UNITED STATES PATENT OFFICE.

JAMES M. DELANEY, OF MANHATTAN, ILLINOIS.

WEED-CUTTER.

1,195,919.   Specification of Letters Patent.   Patented Aug. 22, 1916.

Application filed April 25, 1916. Serial No. 93,464.

*To all whom it may concern:*

Be it known that I, JAMES M. DELANEY, a citizen of the United States, residing at Manhattan, in the county of Will and State of Illinois, have invented new and useful Improvements in Weed-Cutters, of which the following is a specification.

This invention relates to weed cutters, and it has for its object to produce a device of this class of simple and improved construction which may be easily and inexpensively operated and by the use of which the roots of weeds, such as thistles, morning glories and the like will be cut or severed beneath the surface of the soil, the stalks or top portions of the plants remaining exposed to the weather after the cutting of the roots so that they will be quickly destroyed.

A further object of the invention is to simplify and improve the construction of the weed cutter and especially the construction of the knife that cuts the roots of plants below the surface of the soil and the manner of mounting such knife.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of a weed cutter constructed in accordance with the invention. Fig. 2 is a longitudinal sectional view taken on the line 2—2 in Fig. 1. Fig. 3 is a transverse sectional view taken on the line 3—3 in Fig. 1. Fig. 4 is a perspective detail view showing the cutter and the supporting means for the same.

Corresponding parts in the several figures are denoted by like characters of reference.

The frame of the improved machine is composed of side members 15 that are connected and spaced apart by a plurality of cross pieces 16. A draft bar 17 is connected with the forward ends of the side members 15 by means of links 18. A seat 19 for the driver or operator is mounted on one of the cross bars 16.

Secured on the outer faces of the side members 15 are vertically disposed blades 20, said blades having downwardly and rearwardly inclined cutting edges 21. Mounted on the side members 16 adjacent to the rearward ends of the blades 20 are downwardly extending brackets 22, the lower ends of which support the knife holder 23. Said knife holder consists of a substantially rectangular plate of metal, such as cast iron, having a transverse bore 24 from which a slot 25 extends to the forward edge of the plate, the top and bottom faces of the plate being beveled in the direction of said slot so as to present sharp edge portions 26. The bottom wall of the bore 24 has a longitudinal groove 27. The cutting blade 28 consists of a plate of steel, the forward edge of which is sharpened to present a cutting edge 29. The rearward portion of the blade 28 is bent to present a partial coil 30 which may be inserted endwise into the bore 24, the forwardly extending portion of the blade extending through the slot 25 which is of such dimensions that the blade will snugly fit therein. The free edge of the coil 30 is bent to present a rib 31 that engages the groove 27, thereby reinforcing the construction and obviating any possibility of the coil portion 30 rocking about its axis. The tapered portions 26 of the holder 23 will lie snugly against the upper and lower faces of the blade 28 so as to present no obstruction to the operation of the device.

In operation, the device is drawn over the ground by power applied to the draft bar 17. The weight of the machine itself, supplemented by that of the driver, will force the cutting blade 28 into the ground so as to cut slightly below the surface, thereby severing the roots of any weeds and other plants that are growing in the path of the machine. The blades 20 at the sides of the machine will simply cut slits in the surface of the soil that will facilitate the operation of the machine by providing openings for the passage of the brackets 22. The weeds and plants that are severed will obviously lie on the surface of the ground where they will be exposed to the rays of the sun and be quickly withered and destroyed.

Having thus described the invention, what is claimed as new, is:—

1. In a weed cutter, a frame including side members suitably spaced and connected together, vertical blades secured on the outer faces of the side members and having inclined cutting edges, brackets secured on the side members to the rearward of the vertical blades, a knife holder carried by the brackets, and a horizontal cutting blade carried by the knife holder.

2. In a weed cutter, a frame, downwardly extending brackets connected therewith, a knife holder carried by said brackets, said holder consisting of a plate having a longitudinal bore, and a slot connecting said bore with the forward edge of the plate, and a cutting blade engaging the slot and having its rearward end bent to produce a coil occupying the bore.

3. In a weed cutter, a frame, downwardly extending brackets connected therewith, a knife holder carried by said brackets, said holder consisting of a plate having a longitudinal bore, and a slot connecting said bore with the forward edge of the plate, and a cutting blade engaging the slot and having its rearward end bent to produce a coil occupying the bore, said coil having its edge portion bent to produce a rib, and the wall of the bore being provided with a groove for engagement with said rib.

4. In a weed cutter, a frame, downwardly extending brackets connected therewith, a knife holder carried by said brackets, said holder consisting of a plate having a longitudinal bore, and a slot connecting said bore with the forward edge of the plate, and a cutting blade engaging the slot and having its rearward end bent to produce a coil occupying the bore, the top and bottom faces of the holder being beveled in the direction of the slot.

5. In a weed cutter, a frame, downwardly extending brackets connected therewith, a knife holder carried by said brackets, said holder consisting of a plate having a longitudinal bore and a slot connecting said bore with the forward edge of the plate, and a cutting blade engaging the slot and having its rearward end bent to produce a coil occupying the bore, said coil having its edge portion bent to produce a rib, and the wall of the bore being provided with a groove for engagement with said rib; the top and bottom faces of the holder being beveled in the direction of the slot to produce sharp edge portions adjacent to the top and bottom faces of the cutting blade.

In testimony whereof I affix my signature.

JAMES M. DELANEY.

Copies of this patent may be obtained for five cents each, by addressing the "Commissioner of Patents, Washington, D. C."